United States Patent [19]

Beyor

[11] Patent Number: 4,742,220
[45] Date of Patent: May 3, 1988

[54] SYSTEM FOR OPTICAL SCANNING OVER A LARGE DEPTH OF FIELD AND OBTAINING HIGH RESOLUTION OF BAR CODES

[75] Inventor: David Beyor, Auburn, N.Y.

[73] Assignee: Skan-A-Matic Corp., Elbridge, N.Y.

[21] Appl. No.: 652,988

[22] Filed: Sep. 20, 1984

[51] Int. Cl.⁴ .............................................. G06K 7/10
[52] U.S. Cl. ................................... 250/216; 250/568; 235/462; 235/472
[58] Field of Search ....................... 235/462, 472, 463; 382/59, 62; 250/568, 216

[56] References Cited

U.S. PATENT DOCUMENTS

| | | | |
|---|---|---|---|
| 3,417,234 | 12/1968 | Sundblad | 235/472 |
| 3,853,403 | 12/1974 | Bentley | 235/462 |
| 3,985,999 | 10/1976 | Yoneyama | 235/472 |
| 4,056,804 | 11/1977 | Whitfield et al. | 382/59 |
| 4,104,616 | 9/1978 | Isshiki et al. | 382/59 |
| 4,288,690 | 9/1981 | Sanner | 250/568 |
| 4,408,120 | 10/1983 | Hara et al. | 235/462 |
| 4,538,072 | 9/1985 | Immler et al. | 235/472 |

FOREIGN PATENT DOCUMENTS 0101564 6/1983 Japan ................................... 235/472

Primary Examiner—Edward P. Westin
Assistant Examiner—Charles F. Wieland
Attorney, Agent, or Firm—John P. Murphy

[57] ABSTRACT

Optical scanning apparatus of the invention has a scanning range with a large depth of field through the use of a plurality of light sources, which are disposed in a cluster and directed at the bar code to be read thereby increasing the amount of light at the focal plane. This increases the depth of field in which the scanner is effective. A rectangular aperture stop with a length several times the width controls the F/# and allows an increased amount of light to reach the photodetector. A rectangular receiving slit provides an elliptical field of view of the photodetector with the long axis aligned with the bars of the code to be read, so that the scanner is able to "see" a major portion of the bar or space instead of a small area which may contain printing errors. Thus the intensity of illumination on the object being scanned is maximized, while the depth of the field, and the signal to noise ratio of the receiving system is also maximized so as to enable the resolution of fine, dense, bar codes.

4 Claims, 2 Drawing Sheets

SYSTEM FOR OPTICAL SCANNING OVER A LARGE DEPTH OF FIELD AND OBTAINING HIGH RESOLUTION OF BAR CODES

BACKGROUND OF THE INVENTION

1. Field of the Invention

This invention related to optical scanning systems and particularily to scanning apparatus having a scanning range including a large depth of field. The invention is especially suitable for use in a bar code scanner for reading the bar codes of the type usually found on consumer products, for example the uniform grocery product or UPC code.

2. Description of the Invention

Various scanning systems have been developed for many processing industries to read bar code symbols, which uniquely identify an object to be processed, to decode the symbol to a multiple digit representation for record keeping and inventory control purposes. For example, blood banks have begun to identify blood bags with bar code symbols to facilitate processing. In the processing and packaging of many drugs, and other industrial products there is a need to rapidly and accurately identify, and differentiate between many products.

The magazine distribution industry widely distributes magazines on a consignment basis, and therefore the need exists for accurately and quickly tallying the returned magazines for credit validation. Similarly, the record and tap industry requires accurate inventory information of its sold and returned products.

There are several scanning systems in current use. For example there are point of sale or deck scanners which are large, stationary installations which are built into an immovable structure such as a super market counter. In these scanners the symbol, or bar code, must be oriented face-down during passage of the object through the system. Other systems include contact-type and non-contact-type wand bar code readers which are positioned near the symbol, and manually dragged across the symbol. In such applications, and particularly in the non-contact type of bar code readers, it is critical for the operator to maintain the bar code reader an exact distance from the symbol, and to aim the bar code reader in a uniform manner in order to maintain a uniform depth of field, or focal point to properly read the bar code.

Other bar code scanners, which are generally available, use a source of coherent light from a laser and scan the light in various directions across a window on which the object having the code is placed. Because the laser illumination is intense and the aperture stop is small, or F number (F#) is large, the scanner is not sensitive so far as depth of field is concerned and the bar code may be located over a large distance of several inches forwardly of the window. The bar code signal is obtained by a photodetector which is responsive to light scattered from the bar code as the laser beam scans across the code. An example of a laser bar code scanner may be had by reference to U.S. Pat. No. 3,978,317, issued Aug. 31, 1976. The use of lasers in bar code scanners is disadvantageous because of their expense and also because intense laser light is regarded as a health hazard. As a result laser devices must be registered with the U.S. Bureau of Radiological Health in the United States.

Accordingly, it is desirable to utilize the non-coherent light of conventional lamp or light-emitting diodes, in optical scanners. The illumination of the code with non-coherent light is not as intense as the laser light. Moreover, in order to be practical for commercial use the scanner must be able to read codes located over a wide depth of field in front of the scanner as well as be tolerant of tilt and skew within the depth of the field. As the bar codes become smaller high resolution capability is essential on the code reader. When a small aperture stop is used in the optical system of the reader corresponding to a large F/# in order to get a large depth of field, the system is limited by noise when non-coherent light or white light is used. The noise characteristics are constant and depend on upon the noise generated in the photodetection process to a large extent. Thus when the F/# is high, the intensity of the illumination on the photodetector is reduced. The system is then signal to noise limited and incapable of resolving fine or high density bar codes. The problem is still further exacerbated when it is desired to use a non-coherent light in a hand held scanner.

It is a principal object of the present invention to provide an improved system for optically scanning over a large depth of field.

It is a further object of the present invention to provide an improved optical scanner capable of reading bar codes with high resolution even though non-coherent or white light is used as the source of illumination of the code.

It is still a further object of the present invention to provide an improved scanner for bar codes and the like which uses a non-coherent light source, and which is suitable for reading fine or high density bar codes.

SUMMARY OF THE INVENTION

Briefly described, optical scanning apparatus embodying the invention provides a scanning range with a large depth of field through the use of a plurality of visible light sources disposed in a cluster and projected directly at the bar code to be read thereby increasing the amount of light at the focal point, thus increasing the depth of field and the target distance in which the bar code reader can effectively read the bar codes. A rectangular aperture stop with a greater length than width is located in the receiving light path between the focal point, or target bar code, and the photodetector. The rectangular aperature stop controls the F/# and determines the amount of light which reaches the photodetector. The rectangular aperature stop provides a narrow, eliptical field of view, with the width the long axis aligned with the bars of the code to be read. The scanner is able to "see" a major portion of a bar or space instead of only a small area which may contain printing errors. Thus the intensity of illumination on the object being scanned is maximized, while the depth of field, and the signal to noise ratio of the receiving system is also maximized so as to enable the resolution of fine, dense, bar codes.

The foregoing and other objects, features, and advantages of the invention, as well as a preferred embodiment thereof, will become more apparent from a reading of the following description in connection with the accompanying drawings.

DETAILED DESCRIPTION OF THE PREFERRED EMBODIMENTS

Figure 1:
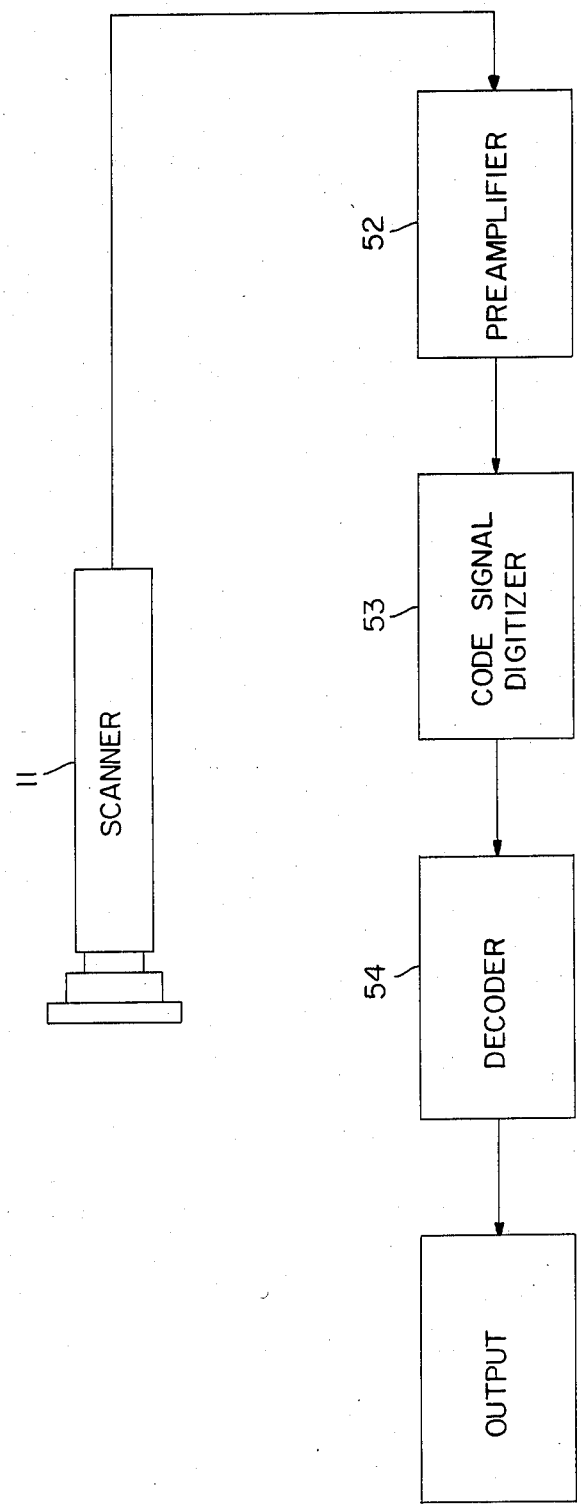
FIG. 1 is a diagram schematically illustrating an optical scanning system embodying the invention.
Figure 2:
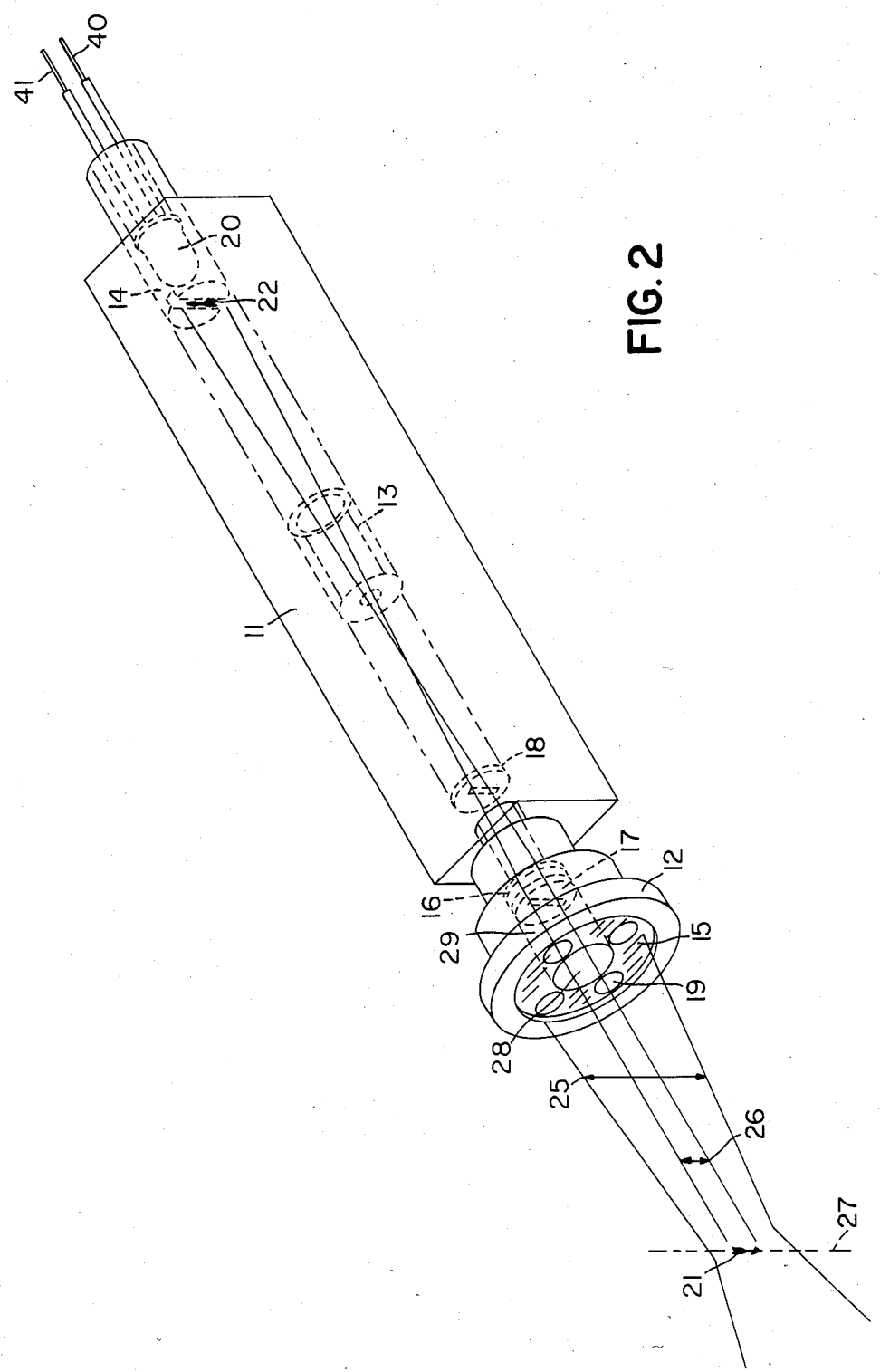
FIG. 2 is a plan view showing internal components of an optical scanner.

Referring now to FIG. 1, and FIG. 2, of the drawings reference numeral 11 generally identifies a scanner for use in reading and/or analyzing bar code symbols. Such symbols comprise a series of lines and spaces of varying widths, which pattern decodes to a multiple digit representation characteristic of the object bearing the symbol. Typical bar codes in current use are the Universal Product Code (UPC), EAN, Codabar, Code 39, and code 2 of 5. There is a light source 19 which preferably consists of a cluster of four or more light emitting diodes which direct a large amount of light directly on the target which may be a bar code, and the bar code is scanned in parallel fashion. The light receiving system includes a rectangular lens stop, or aperture stop 17 which controls the depth of the field as it pertains to the width of the bar code which is the important factor inasmuch as the image received by the photodetector is elliptical in shape and is less susceptible to defects in the bar code than a round field of view of the same width. The height of the rectangular aperture is made as large as possible to permit the passage of as much light as possible so as to increase the depth of view of the scanner. Baffles 18, and 13 block out stray light. The image recived by the photodetector 20, which may suitably be a photodiode, is the inverse of the image reflected by the target as shown by the arrows in FIG. 2. The output of the photodetector is an electrical signal from which a bar code signal is generated. The electrical signal is preamplified in a preamplifier 52. A bar code signal digitizer 53 translates the signal from the preamplifier into a variable width pulse train corresponding to the bar code which is being scanned. The bar code signal generator may utilize two series connected differentiator circuits. The output of the first differentiator is used to obtain a degree of noise immunity and may be applied to comparators to set thresholds which the level of the signal from the second differentiator must exceed before being regarded as valid. The output of the second differentiator indicates by its zero crossings the location of the edges or transitions between the white and dark areas of the code. These edges, whether white to dark or dark to white, may be determined by their polarity and used to set and reset a flip-flop so as to provide the pulse train of variable width corresponding to the scanned bar code. This pulse train may be translated to a requisite level for use in digital logic for decoding the bar code in the decoder 54. The preamplifier and bar code signal generator may be part of the scanner which is connected to the decoding logic which may be part of the computer system with which the scanner is used.

In FIG. 2 there is shown a module which contains all of the optical, mechanical, and electronic components for a scanner of the type described in FIG. 1. These components may be contained in a scanner or sensor 11, which may be rectangular in shape and may be fixed beam, off the surface, optical sensors, or moving beam scanners, or the scanner may be in the shape of a gun with a trigger to initiate a scan when the object being scanned is positioned within the depth of field in front of the scanner. Housing 12 is located at the front, or light transmitting end of scanner 11 and has mounted therein four LEDS 19 which transmit a large amount of incoherent light directly to the target or focal plane 21 through cover glass 15. Housing 12 also contains a cylinderical tube 29 in which is mounted a rectangular shaped aperture stop 17, and double convex lens 16, and a cylindrical opening 28 through which the received light from the target 21 returns to the photodetector through a rectangular receiving slit 22 which may be interchangeably positioned in cell holder 14, in which photodiode or photodetector 20 is mounted. Rectangular receiving slit 22 may be changed in size depending upon the size of the bar code which is being read. Receiving slit 22 of cell holder 14 defines the elliptical image received by the photo detector 20. This is very important to the proper optical resultion of the bar code. Fields of view that are too large do not properly resolve narrow bars and spaces. Fields of view that are too small will resolve blemishes in the bar code. In such cases, the signal that results may contain errors and may be misinterpreted by the decoder. The shape of the field of view can greatly influence a sensor's ability to resolve bar code. A small round field, such as has been used in the past is particularily suspectible to blemishes. However the elliptical field of view of the present invention is much less suspectible to defects than a round field of view of the same width. Thus, the elliptical image received by the photodetector combined with the greater intensity of the light transmitted to the object being scanned increases the depth of the field, which is the maximum and minimum distance at which the bar code can be read, and increases the signal to noise ratio of the receiving system so as to read fine, dense bar codes. Arrow 25 indicates the width of the transmitted light beam. Arrow 26 indicates the height of the received light beam. Broken line 27 shows the vertical axis of the total view. Wires 40 and 41 go to a preamplifier of FIG. 1.

From the foregoing description it will be apparent that there has been provided an improved optical scanning system. Variations and modifications of the described system, within the scope of the invention, will undoubtedly suggest themselves to those skilled in the art. For example, small, high intensity incandescent lamps may be used instead of the light emitting diodes. Accordingly, the foregoing description should be taken as illustrative and not in a limiting sense.

I claim:

1. Bar code scanning apparatus comprising a photosensor, a plurality of incoherent light sources which project intensely luminous incoherent light on a bar code, and a light receiving system including a rectangular lens stop with the long axis of the lens stop aligned with the long axis of the bars of the bar code, said lens stop cooperating with a convex lens disposed between said lens stop and a rectangular receiving slit which defines an elliptical image on said photosensor to maximize the signal to noise ratio of the receiving system, and provide a large depth of field.

2. Bar code scanning apparatus according to claim 1 in which the rectangular receiving slit is manually replaceable.

3. Bar code scanning apparatus according to claim 1 wherein the incoherent light sources consists of two or more light emmitting diodes.

4. Bar code scanning apparatus according to claim 1 wherein the incoherent light sources consists of two or more incandesent lamps.

* * * * *